United States Patent
Chernyak et al.

[11] Patent Number: 5,951,939
[45] Date of Patent: Sep. 14, 1999

[54] METHOD FOR HEATING FILMS FOR THERMOFORMING

[75] Inventors: Zinoviy Chernyak, Farmington Hills; Jeffery K. Christensen, Caledonia, both of Mich.

[73] Assignee: Ford Motor Company, Dearborn

[21] Appl. No.: 08/903,520

[22] Filed: Jul. 30, 1997

[51] Int. Cl.$^6$ ........................................... B29C 35/00
[52] U.S. Cl. .................. 264/522; 264/322; 219/392; 219/397; 392/418
[58] Field of Search ............................... 264/327, 446, 264/487, 493, 522, 322, 319; 432/147, 148; 219/397, 392; 392/418

[56] References Cited

U.S. PATENT DOCUMENTS

| | | |
|---|---|---|
| 3,668,034 | 6/1972 | Nicholas et al. . |
| 4,216,177 | 8/1980 | Otto ........................................... 264/25 |
| 4,584,157 | 4/1986 | Sweig ....................................... 264/522 |
| 4,650,533 | 3/1987 | Parker et al. . |
| 4,769,100 | 9/1988 | Short et al. . |
| 4,902,557 | 2/1990 | Rohrbacher . |
| 4,913,760 | 4/1990 | Benson et al. . |
| 4,976,896 | 12/1990 | Short et al. . |
| 5,034,077 | 7/1991 | Pata . |
| 5,034,269 | 7/1991 | Wheeler . |
| 5,037,680 | 8/1991 | Papendick et al. . |
| 5,055,346 | 10/1991 | Rohrbacher . |
| 5,114,789 | 5/1992 | Reafler . |
| 5,125,994 | 6/1992 | Harasta et al. . |
| 5,192,609 | 3/1993 | Carroll, Jr. . |
| 5,208,081 | 5/1993 | Gübitz et al. . |
| 5,215,811 | 6/1993 | Reafler et al. . |
| 5,215,826 | 6/1993 | Shimanski et al. . |
| 5,248,364 | 9/1993 | Liu et al. . |
| 5,271,352 | 12/1993 | Wilson . |
| 5,342,666 | 8/1994 | Ellison et al. . |
| 5,350,473 | 9/1994 | Weder et al. . |
| 5,435,865 | 7/1995 | Lee et al. . |
| 5,514,427 | 5/1996 | Ellison et al. . |
| 5,536,539 | 7/1996 | Ellison et al. . |
| 5,538,576 | 7/1996 | Knop et al. . |
| 5,585,187 | 12/1996 | Shinonaga et al. . |
| 5,599,608 | 2/1997 | Yamamoto et al. . |

*Primary Examiner*—Jan H. Silbaugh
*Assistant Examiner*—Edmund H. Lee
*Attorney, Agent, or Firm*—Damian Porcari

[57] ABSTRACT

A method of heating a film prior to thermoforming by the following steps. A thermoplastic flexible film having a painted surface and a thermoplastic backing sheet is placed within a frame. The frame and film are placed within a heater. The heater has first and second radiating surfaces. The first and second radiating surfaces are parallel to the ground and the first radiating surface is above said second radiating surface. The first radiating surface is opposite the backing sheet and the second radiating surface is opposite said painted surface. The backing sheet is heated to a first temperature sufficient to cause the backing sheet to become pliable. The first temperature is a first difference above ambient temperature. The painted surface is heated to a second temperature. The second temperature is a second difference above ambient temperature and the first difference is between 2 to 20 times greater than the second difference.

8 Claims, 1 Drawing Sheet

METHOD FOR HEATING FILMS FOR THERMOFORMING

BACKGROUND OF THE INVENTION

1. Field of the Invention

The present invention relates to a method of heating films for thermoforming. More specifically, the invention relates to a method for heating a painted film with a colored layer and a clear coating that are easily damaged by exposure to excessive heat.

2. Description of the Related Arts

It is known to manufacture molded articles by using pre-molded film laminates. A flexible film having a painted surface and a backing surface is thermoformed into the shape of the final article and placed within a molding press. The thermoforming operation requires that the film be heated to make it pliable and then thermoformed against a forming mandrel. This process produces a painted film preform that is subsequently placed within a molding press. The molding press injects a molten plastic material that adheres to the backing surface to produce the finished article.

It is desirable to produce finished articles that conform to the color and surface appearance of the adjacent article. This is especially true when the film-covered article is an automotive component such as a bumper fascia. The fascia is painted the same color as other body components and must display the same color, gloss and Distinction of Image (DOI) as the adjacent painted metal components. This usually requires painting the film with a colored layer and clear coat paints that match the paint of the adjacent metal components.

U.S. Pat. No. 4,913,760, teaches a method of placing the painted film on a temporary carrier and drying the painted film at successively higher temperature to avoid damaging the film. The temporary carrier is removed. The 4,913,760 reference does not teach heating the film prior to thermoforming to make it pliable nor heating the painted surface differently than the backing surface.

Heretofore, the film was placed within a heater or oven that evenly heated both surfaces of the film. The inventors found that heating both surfaces of the film often damaged the painted surface and reduced its appearance making it less suitable for use in automotive applications.

These deficiencies and problems are overcome by the present invention.

SUMMARY OF THE INVENTION

The present invention relates to a method of heating a film prior to thermoforming comprising the following steps. A thermoplastic flexible film having a painted surface and a backing sheet is placed within a frame. The frame and film are placed within a heater. The heater has first and second radiating surfaces. The first and second radiating surfaces are parallel to the ground and the first radiating surface is below said second radiating surface. The first radiating surface is opposite the backing sheet and the second radiating surface is opposite said painted surface. The backing sheet is heated to a first temperature sufficient to cause the backing sheet to become pliable. The first temperature is a first difference above ambient temperature. The painted surface is heated to a second temperature. The second temperature is a second difference above ambient temperature and the first difference is between 2 to 20 times greater than the second difference.

The present invention enables the use of traditional molding mandrels. Because the film is retained on the mandrel, it is precisely trimmed in the same location. The invention greatly facilitates the manufacture of large complex articles that require trimming of a three-dimensional film.

These and other desired objects of the present invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
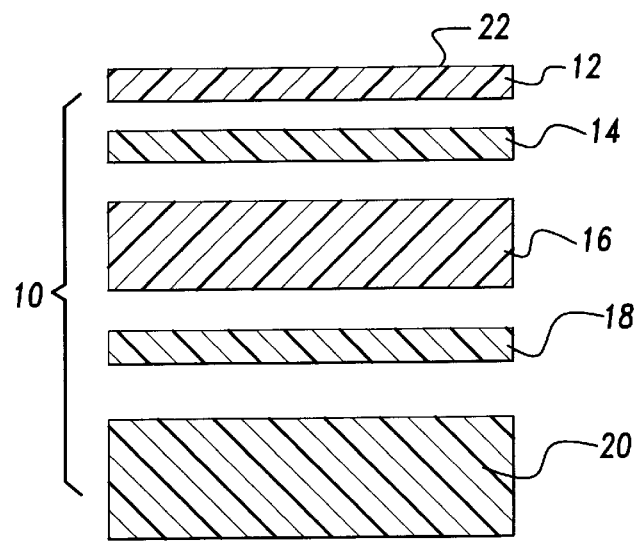
FIG. 1 is a cross-sectional, exploded view of a flexible film used in the present invention.

The present invention will be described through a series of drawings, which illustrates a film and heating equipment used in the present invention. The invention will be illustrated as forming a film-preform for an automotive bumper facia. Other exterior painted components may be manufactured using the same or similar technique and equipment and are included within the invention described herein.

The following items are a word list of items described in the drawings and are reproduced to aid in understanding the invention:

10 film
12 clear coat
14 gravure printed design
16 colored layer
18 thermoplastic size coat
20 backing sheet
22 painted surface
24 coils
26 loading station
28 frame
30 heater
32 upper radiating surface
34 lower radiating surface
36 thermoforming station
38 thermoforming press
40 mandrel FIG. 1 illustrates a cross-sectional, exploded view of a thermoformed flexible film useful in the present invention. The film 10 is made from a thermoformable material such as Avloy™ manufactured by Avery Dennison or ISF™ manufactured by 3M/Rexam. The film 10 has a multi-layer construction including a polyvinylidene fluoride (PVDF) clear coat 12, an optional gravure printed design 14, a PVDF acrylic colored layer 16, a thermoplastic size coat 18 and a backing sheet 20. The painted surface 22 of the film 10 includes layers 12, 14 and 16. The colored layer 16 provides the pigments to color the film 10. The clear coat 12 provides luster and UV protection. The sizing coat 18 is an intermediate layer that promotes adhesion between the colored layer 16 and the backing sheet 20. The backing sheet 20 is made from a thermoplastic material that provides a measure of rigidity and strength to the film 10 and fuses to the plastic substrate. The film 10 is still generally flexible and has a total thickness between 0.008 and 0.080 inches. The materials and construction of the film 10 is generally commercially available and is not a part of this invention.

Figure 2:
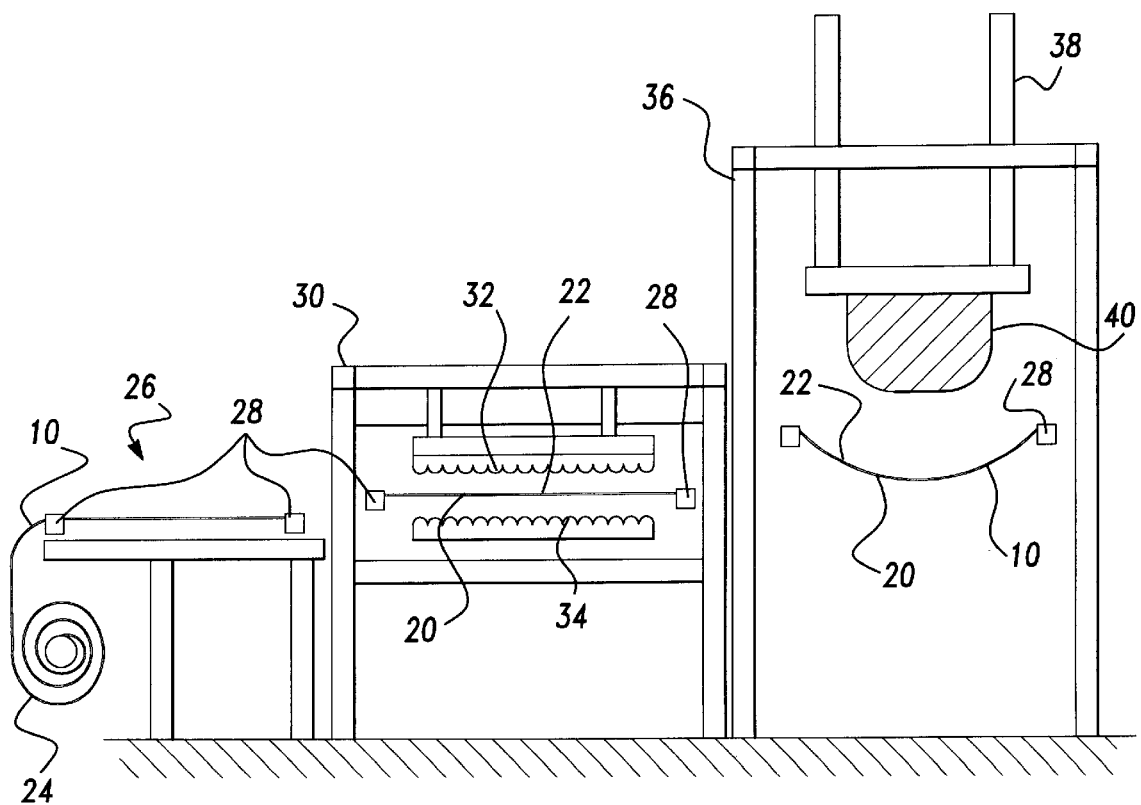
FIG. 2 is a perspective view of a heating and thermoforming apparatus used to heat the film in FIG. 1.

The film 10 is usually stored in coils or rolls 24 as illustrated in FIG. 2 but may also be cut in to sheets. The film 10 is uncoiled and loaded into a loading station 26. The film 10 is placed within a frame 28 that holds the film 10 during heating and thermoforming. After the film 10 is placed within the frame 28, it is cut from the coil 24 and heated.

The film 10 must be heated to a temperature in excess of its glass transition temperature ($T_g$) to make it pliable for subsequent thermoforming. The film 10 and frame 28 are placed into a heater 30. The heater 30 is generally commercially available. Heater 30 has two horizontal radiating surfaces 32, 34 that are heated by electrical or gas fired heaters (not shown). The radiating surfaces 32 and 34 are generally parallel to the ground. The film 10 and frame 28 are placed between the surfaces 32, 34. The film 10 is loaded into the heater 30 so that the painted surface 22 is opposite the lower radiating surface 34 and the backing sheet 20 is opposite the upper radiating surface 32. Heating the Avloy™ film-backing sheet 20 to between 250 and 380° F. and the painted surface 22 to between 100 and 200° F. was found to produce acceptable surface quality of the finished article.

As will be described in greater detail, the temperature from the upper radiating surface 32 is sufficient to heat and soften the backing sheet 20 without damaging the appearance of the painted surface 22. The temperature of the lower radiating surface 32 assists in heating the backing sheet 20, but does not damage the painted surface 22.

The heater 30 warms the film 10 to a temperature sufficient to make it pliable. After the film 10 is heated, it is moved to a thermoforming station 36. The thermoforming station 36 includes a vertically mounted thermoforming press 38. The vertically moveable press 38 enables it to be moved from a fully open position as illustrated to a thermoforming position (not shown). The press 38 includes a thermoforming mandrel 40. The mandrel 40 is formed in the shape of the desired film pre-form. It is made from tool steel or aluminum, but other materials may be used. The frame 28 and the film 10 are placed adjacent the mandrel 40. The film 10 covers the mandrel 30. The moveable press is moved to the thermoforming position. The mandrel 40 contacts the film backing sheet 20 and causes the film 10 to conform to the shape of the mandrel 40. The film 10 is allowed to cool and is then removed from the mandrel 40.

The invention produces finished automotive articles with very high gloss and DOI. These finishes enable them to be positioned adjacent a painted metal article. The inventors found that exposing the painted surface to excessive heat caused the painted surface 22 to lose these properties. The present invention enables heating the film 10 to a temperature sufficient to soften the backing sheet 20 while not damaging the painted surface 22 by exposing the backing to significantly higher temperatures than the painted surface. The heater 30 uses the radiating surfaces 32, 34 to heat the film 10.

The following example describes the ratio of heating between the upper and lower radiating surfaces 32, 34. The upper radiating surface 32 is heated to a first temperature sufficient to cause said backing sheet to become pliable. The difference between this first temperature and ambient temperature is a first difference. The lower radiating surface 34 is heated to a second temperature. The difference between this second temperature and ambient temperature is the second difference. The first difference is between 2 and 20 times greater than the second difference to avoid damaging the painted surface 22. Too low a temperature can cause increased cycle times and insufficient forming definition in the preform. Excessive temperature reduces the gloss and DOI of the painted surface 22.

To better regulate the heating of the film 10, the backing sheet 20 faces the upper radiating surface 32. This serves to keep the painted surface 22 cooler because the heat from the upper radiating surface 32 does not travel downward. If the painted surface faced the upper radiating surface, then the higher temperature needed to heat the backing sheet would travel upwardly and reach the painted surface. Positioning the painted surface downwardly also make it easier to thermoform the film 10 using conventional vertically mounted thermoforming presses 38.

The invention allows the film 10 to be heated to a temperature sufficient to soften the backing sheet 20 while not damaging the painted surface 22. It utilizes existing materials and equipment without the need for modification or alternation.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of heating a film prior to thermoforming comprising the steps of:

providing a thermoplastic flexible film having a painted surface and a thermoplastic backing sheet;

placing said film in a frame;

placing said film within said frame in a heater, said heater having first and second radiating surfaces, said first radiating surface opposite said painted surface and said second radiating surface opposite said backing sheet;

heating said backing sheet to a first temperature sufficient to cause said backing sheet to become pliable for thermoforming said film, wherein said first temperature does not damage the appearance of said painted surface; and heating said painted surface to a second temperature that is substantially less than said first temperature, wherein said second temperature does not damage the appearance of said painted surface.

2. The method of claim 1, where said first temperature is a first difference above ambient temperature and said second temperature is a second difference above ambient temperature and said first difference is between 2 to 20 times greater than said second difference.

3. The method of claim 1, wherein said painted surface includes at least one layer of polyvinylidene fluoride.

4. The method of claim 1, wherein said painted surface includes a colored layer and a clear coat, said colored layer and clear coat are made of polyvinylidene fluoride.

5. The method of claim 1, wherein said first temperature is between 250° F. and 380° F. and said second temperature is between 100° F. and 200° F.

6. The method of claim 1, wherein said first and second radiating surfaces are parallel to the ground and said first radiating surface is above said second radiating surface.

7. A method of heating a film prior to thermoforming comprising the steps of:

providing a thermoplastic flexible film having a painted surface and a thermoplastic backing sheet, said painted surface having a colored layer and a clear coating;

placing said film in a frame;

placing said film within said frame in a heater, said heater having lower and upper radiating surfaces, said lower and upper radiating surfaces being parallel to the ground and said upper radiating surface is above said lower radiating surface, said lower radiating surface opposite said painted surface and said upper radiating surface opposite said backing sheet;

heating said backing sheet to a first temperature sufficient to cause said backing sheet to become pliable for thermoforming said film, wherein said first temperature does not damage the appearance of said painted surface, said first temperature being a first difference above ambient temperature; and heating said painted surface to a second temperature, wherein said second temperature does not damage the appearance of said painted surface, second temperature being a second difference above ambient temperature and said first difference is between 2 to 20 times greater than said second difference.

8. The method of claim 7, wherein said first temperature is between 250° F. and 380° F. and said second temperature is between 100° F. and 200° F.

* * * * *